United States Patent [19]

Crook

[11] Patent Number: 5,365,156
[45] Date of Patent: Nov. 15, 1994

[54] FORCE TRANSDUCER FOR A ROBOTIC ARM

[76] Inventor: James C. Crook, 1405 Chatsworth La., Raleigh, N.C. 27614

[21] Appl. No.: 141,527

[22] Filed: Oct. 27, 1993

[51] Int. Cl.$^5$ ............................................. B25J 15/12
[52] U.S. Cl. .................................. 318/568.16; 901/21; 901/22; 318/568.1
[58] Field of Search .................................. 318/560–646; 901/1, 3, 5, 7, 15, 13, 12, 17, 19, 22, 37, 20, 21, 40, 43, 45, 50, 47

[56] References Cited

U.S. PATENT DOCUMENTS

| | | | |
|---|---|---|---|
| 4,494,417 | 1/1985 | Larson et al. | 901/22 X |
| 4,641,251 | 2/1987 | Inoue | 901/1 X |
| 4,739,692 | 4/1988 | Wassam et al. | 901/22 X |
| 4,751,821 | 6/1988 | Birchard | 901/15 X |
| 4,784,042 | 11/1988 | Paynter | 901/21 X |
| 4,900,218 | 2/1990 | Sutherland | 901/21 X |
| 5,080,000 | 1/1992 | Bubic | 901/22 |
| 5,172,551 | 12/1992 | Nakajima et al. | 901/15 X |
| 5,174,168 | 12/1992 | Takagi et al. | 901/21 X |
| 5,245,885 | 9/1993 | Robertson | 901/37 X |

*Primary Examiner*—Paul Ip
*Attorney, Agent, or Firm*—Rhodes, Coats & Bennett

[57] ABSTRACT

A force transducer for a robotic arm comprises a plurality of axially-contractible cells. Each cell includes first and second end pieces which are interconnected by a pair of flexible connecting members. The connecting members are disposed on opposite sides of a longitudinal axis. The connecting members are deflected inwardly towards the longitudinal axis by a pair of electromagnets to cause a change in length of the transducer. The transducers can be used to impart movement robotic devices.

17 Claims, 6 Drawing Sheets

FORCE TRANSDUCER FOR A ROBOTIC ARM

FIELD OF THE INVENTION

The present invention relates generally to the field of robotics, and more particularly to a force transducer or actuator for a robotic device.

BACKGROUND OF THE INVENTION

Robotic devices are frequently used in manufacturing and in animation. Such robots need to have precise movements in order to perform intricate production tasks and to move in a realistic, life-like manner for animation.

Currently, robots use motors and gears, pneumatics, hydraulics, or pulleys with cables to control movements of robots. The motor and gear controls have problems with backlash when they change direction. Pneumatics and hydraulic systems make noise and may leak. Cables within a sleeve are frequently used but tend to have a jerky motion due to the friction within the sleeve. The use of pulleys and cables to move grippers attached at the end of an arm creates problems with maintaining the right tension and position as the arm bends and moves.

Accordingly, a force transducer or actuator for robotic devices which will enable more precise control over the robot's movements is needed.

SUMMARY AND OBJECTS OF THE INVENTION

The present invention is an actuator for use in robotic devices. The actuator comprises a plurality of force cells disposed in end-to-end relationship. Each force cell includes first and second end plates which are interconnected by flexible connecting members. A pair of opposing electromagnets are placed on the outside of the flexible connecting members. When current is applied to the electromagnets, they are attracted towards one another and bend the connecting members inwardly. The bending of the flexible members causes the force cell to contract along its longitudinal axis.

The actuator is used in robotic devices to effect movement. For example, two actuators are used in conjunction with one another in a manner similar to a human muscle to effect movement of an articulated frame member. One actuator is contracted and the opposite actuator is passively extended for producing motion or deflection of the frame member in one direction, and conversely for producing motion or deflection in the other direction.

Based on the foregoing, it is a primary object of the present invention to provide an actuator for robotic devices which is capable of generating precise movements in a robotic device.

Another object of the present invention is to provide an actuator for a robotic device which is relatively simple in construction and requires a minimum number of moving components.

Another object of the present invention is to provide an actuator for a robotic device that is capable of generating a large amount of force.

Other objects and advantages of the present invention will become apparent and obvious from a study of the following description and the accompanying drawings which are merely illustrative of such invention.

DETAILED DESCRIPTION OF THE INVENTION

Figure 1:
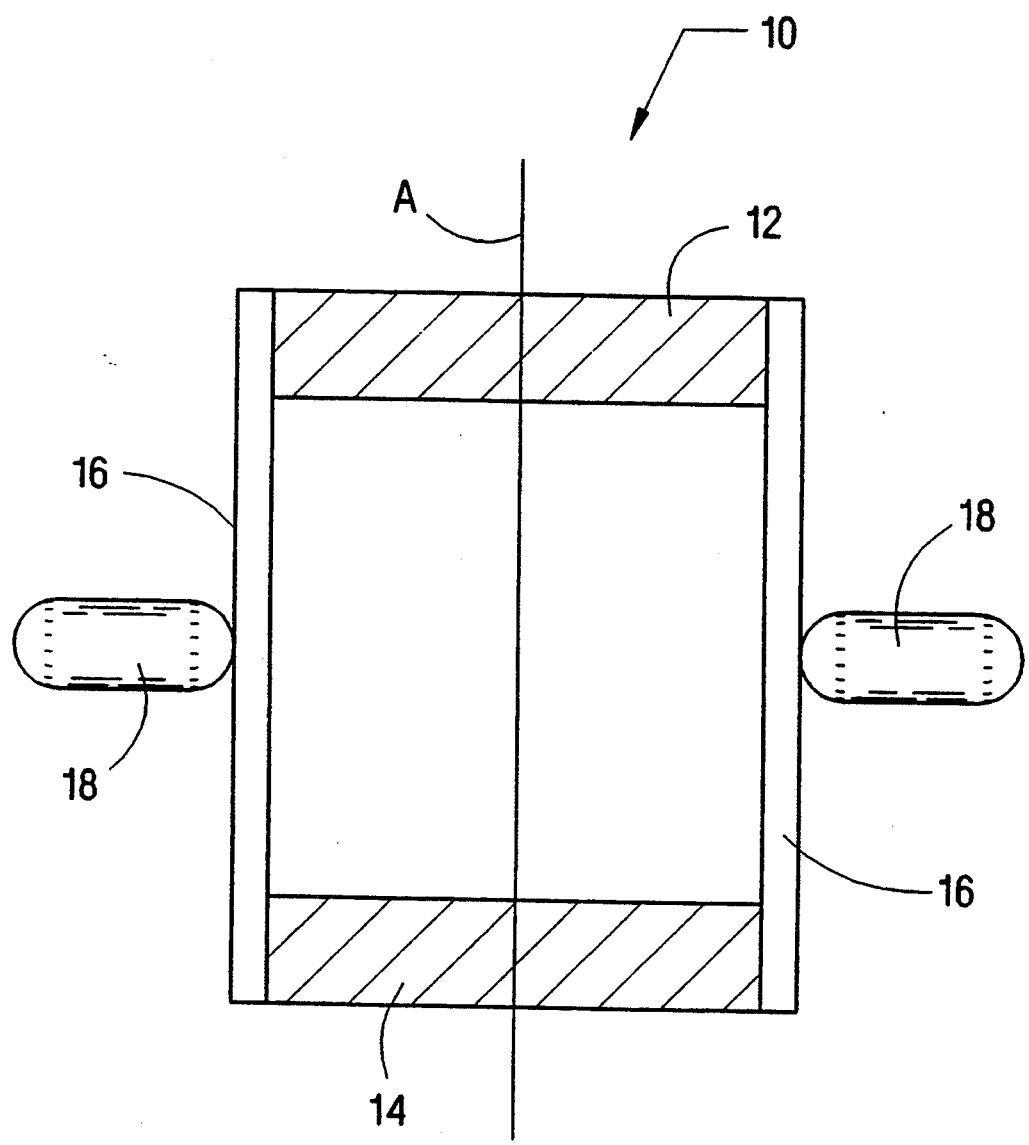
FIG. 1 is a schematic diagram of a single force cell.
Figure 2:
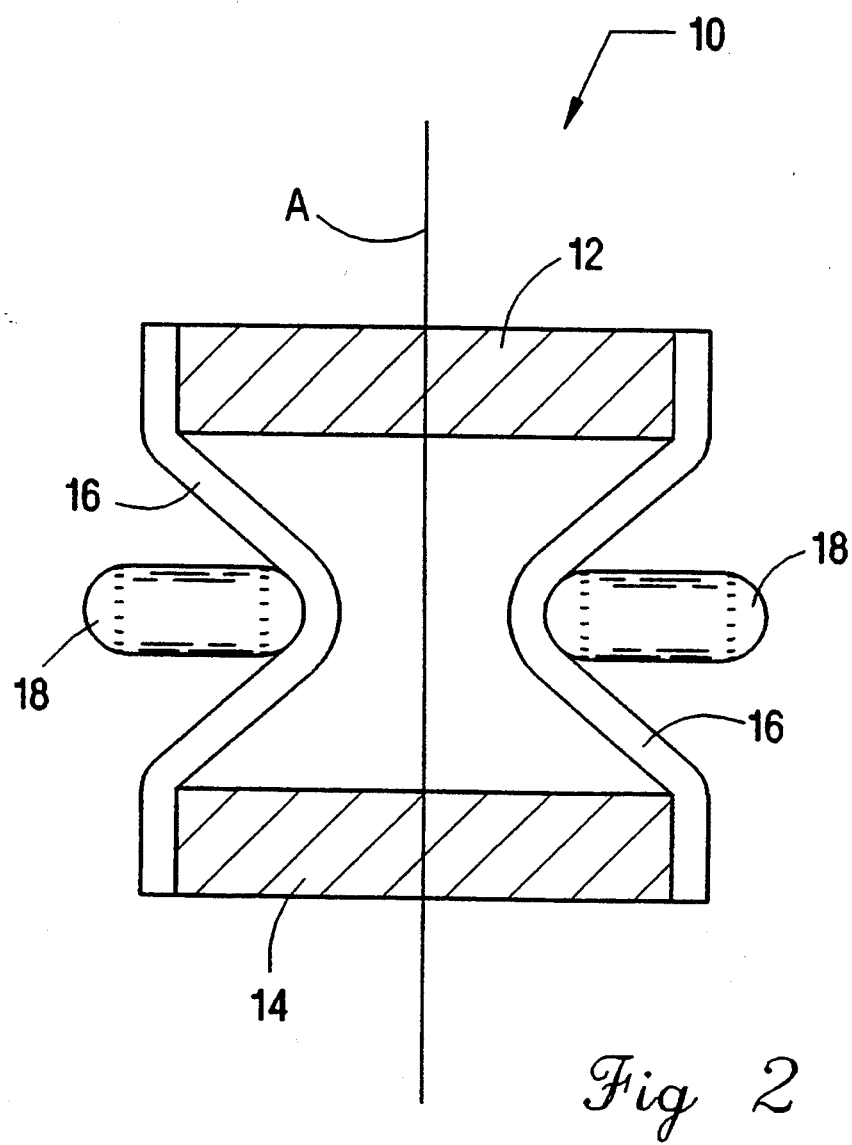
FIG. 2 is a schematic diagram of the force cell in a contracted position.

Referring now to the drawings, and particularly to FIG. 1, a schematic diagram of a force cell is shown therein and indicated generally by the numeral 10. The force cell 10 includes a pair of end pieces 12 and 14 which are spaced from one another along a longitudinal axis. The end pieces 12 and 14 are interconnected by flexible connecting members 16 which extend generally parallel to the longitudinal axis A of the force cell 10. The connecting members are made of a flexible but non-elastic material which has a relatively high strength. A pair of electromagnets 18 are disposed along the outside of the flexible connecting strips 16. When a current is applied to the electromagnets 18, the electromagnetic force causes the magnets 18 move inwardly towards the center. As the electromagnets 18 move toward one another, the connecting members 16 are deflected inwardly to cause contraction of the force cell along the longitudinal axis A as shown in FIG. 2.

One characteristic of the force cell 10 is that it produces relatively large gains in force when the deflection of the connecting members 16 is small. However, the gain diminishes as the amount of the deflection increases. This decrease in gain is offset somewhat by the increase in the electromagnetic force as the magnets 18 move closer to one another. In order to operate in the higher gain region, only small changes in the length of the force cell 10 can be obtained.

Figure 4:
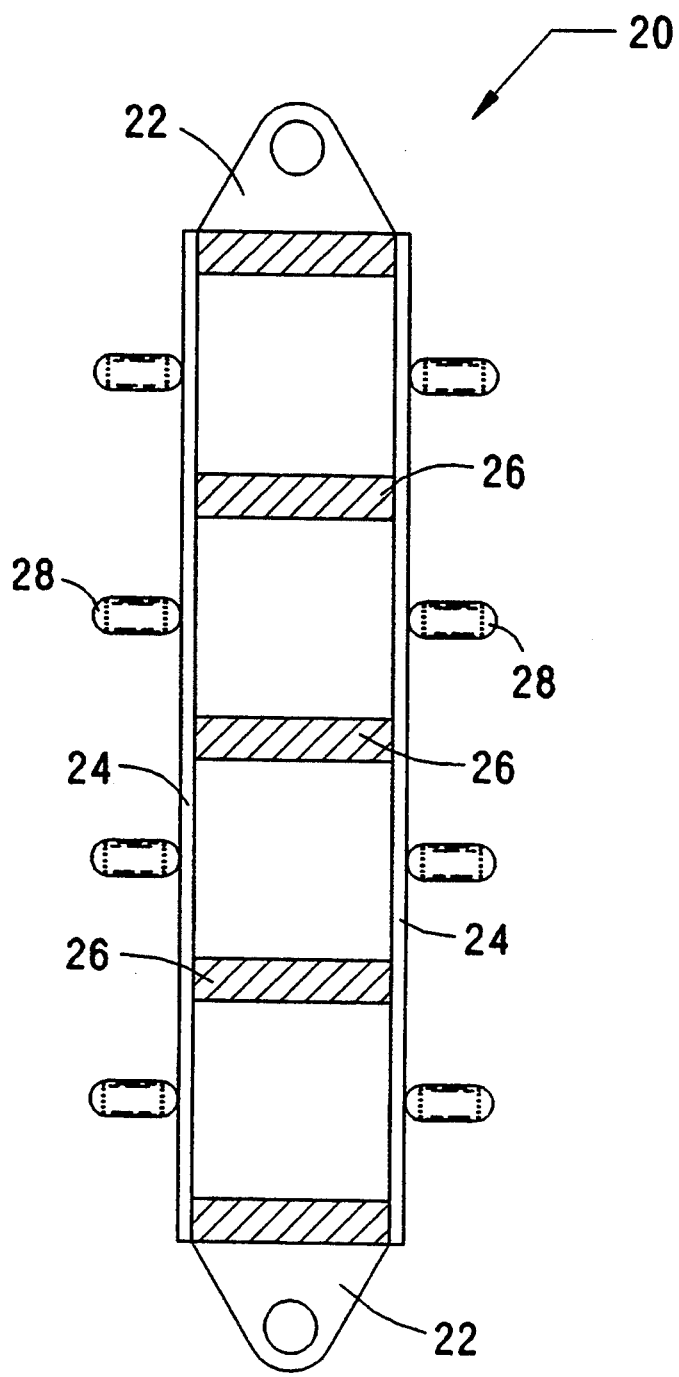
FIG. 4 is a schematic diagram of an actuator comprising a plurality of force cells disposed end-to-end.
Figure 5:
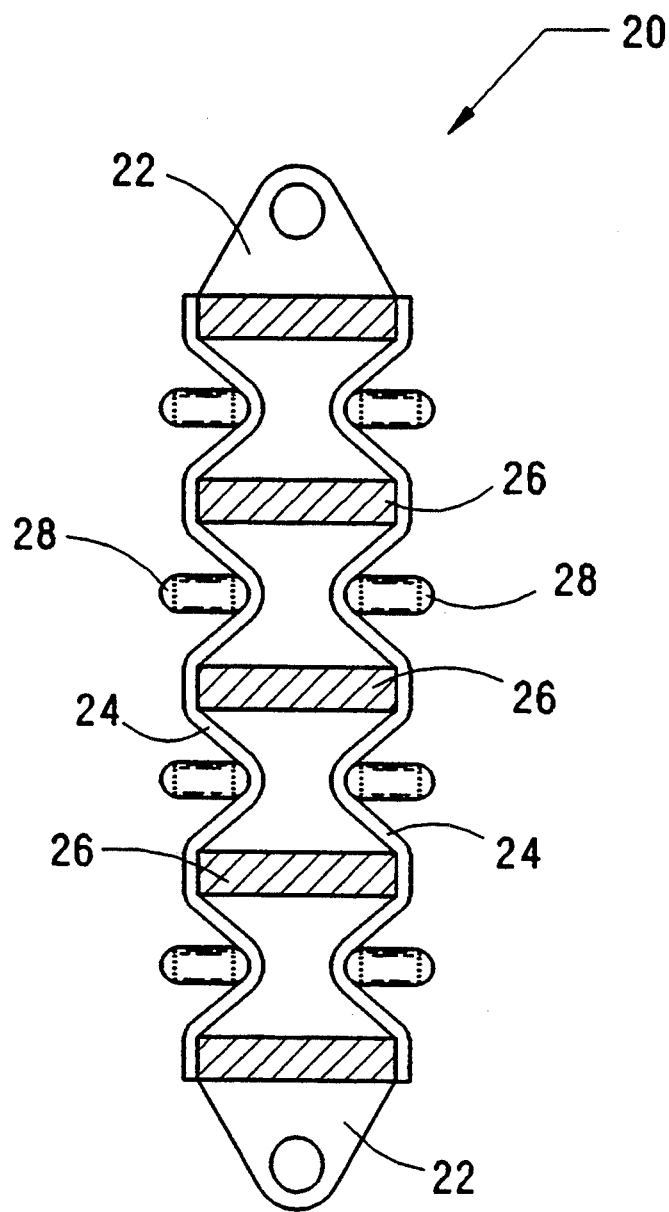
FIG. 5 is a schematic diagram of the actuator of FIG. 3 in a contracted condition.

To obtain larger changes in overall length, a plurality of force cells can be disposed in end-to-end relationship to form an elongated, segmented actuator 20 as shown in FIG. 4. The actuator 20 shown in FIG. 4 comprises two end pieces 22 which are connected to one another by flexible connecting members 24. The connecting members 24 extend parallel to one another along a longitudinal axis. A plurality of rigid spacers 26 are spaced along the longitudinal axis between the end pieces 22. Each spacer 26 includes opposed edges which are secured by any suitable means to the connecting member 24 to prevent the spacers 26 from sliding relative to the connecting member 24. A pair of electromagnets 28 are disposed on the outside of the connecting members 22 in each segment of the actuator. The electromagnet 28 is attached to the outside of the connecting member 24 by a suitable adhesive or other means. Preferably, the electromagnets 28 are centered between the spacers 26 in each segment of the actuator 20. When a current is applied to the electromagnets 28, each segment axially contracts as previously described, as shown in FIG. 5. Thus, the actuator 20 decreases in length by an amount equal to the sum of all of the segments.

Figure 3:
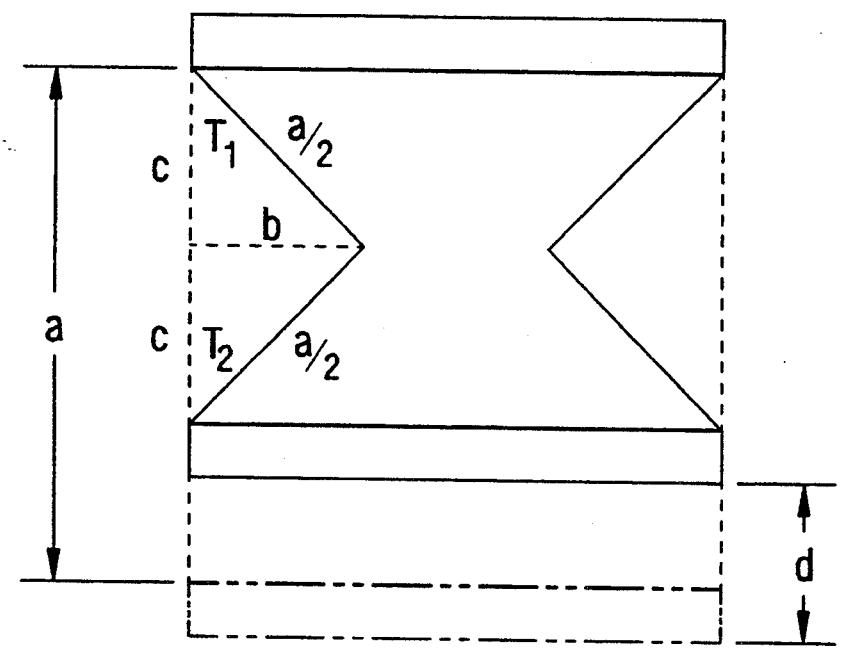
FIG. 3 is a schematic diagram of the force cell in a contracted position with indicia used to calculate changes in length of the force cell.

When the connecting member is deflected, it forms two right triangles, T1 and T2, as shown in FIG. 3. Thus, the change in length of each segment of the actuator 20 can be calculated using the Pythagorean theorem. If a is equal to the length of the connecting member (i.e. the distance between the end pieces 12 and 14), and b is equal to the amount of deflection, then the change in length of each segment $d_s$ can be determined by the following formula:

$$d_s = a - 2\sqrt{\left(\frac{a}{2}\right)^2 - b^2} \quad (1)$$

The total change in length of the actuator $d_t$ can be calculated by multiplying to the number of segments N times the change in length per segment $d_s$ as set forth below:

$$d_t = N(d_s) \quad (2)$$

The gain in force can be determined by the following formula:

$$g = \frac{b}{d_s} \quad (3)$$

Table 1 below illustrates the gain for an actuator in which a is equal to 10. The table shows the gain where the amount of deflection b varies between 0 and 5. As shown in graph, the highest gains occur when the amount of deflection is less than 2 and more so when the amount of deflection is less than 1. It is preferable to operate the actuator in this higher gain region.

TABLE I

| b | $d_S$ | g |
|---|---|---|
| 0 | 0 | — |
| .5 | .05 | 10.0 |
| 1.0 | .20 | 5.0 |
| 1.5 | .46 | 3.26 |
| 2.0 | .83 | 2.41 |
| 2.5 | 1.34 | 1.87 |
| 3.0 | 2.0 | 1.50 |
| 3.5 | 2.86 | 1.22 |
| 4.0 | 4.0 | 1.0 |
| 4.5 | 5.64 | .80 |
| 5.0 | 10.0 | .5 |

The actuator 20 of the present invention is used in a manner similar to the human muscle. The human muscle contracts and relaxes to effect bodily movement. Human muscles, as a general rule, operate in pairs to effect the movement in opposite directions. One muscle contracts while its companion muscle relaxes to cause movement in a first direction, and conversely to effect movement in the other direction. The force actuator 20 of the present invention can be employed in a manner similar to human muscles to effect the movement of robotic devices.

Figure 6:
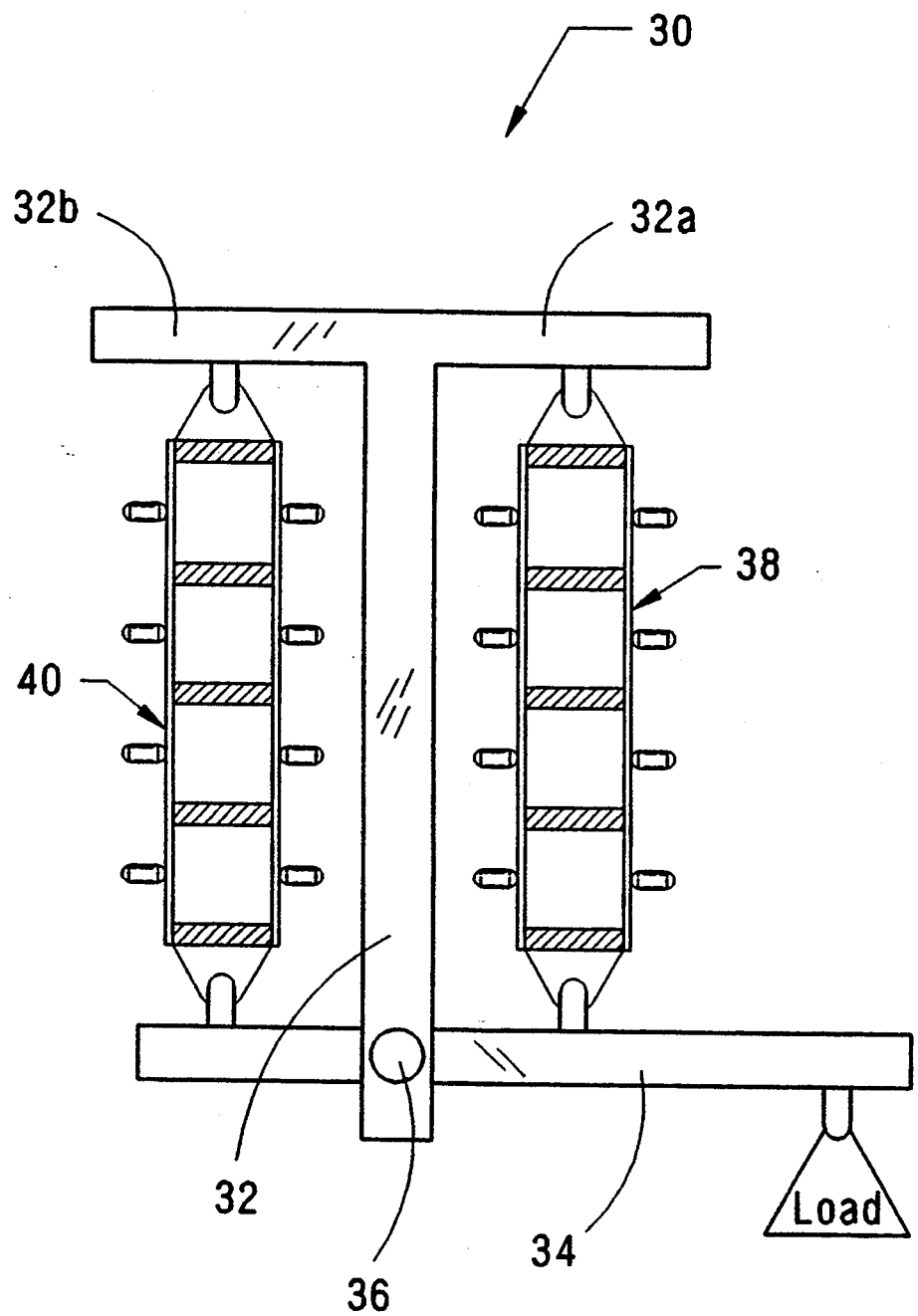
FIG. 6 is a schematic diagram illustrating a robotic arm using the force actuators of the present invention.

Referring now to FIG. 6, a robotic arm is shown. The robotic arm 30 includes articulated frame members 32 and 34. The frame members 32 and 34 are pivotally connected to one another to form a joint 36. Frame member 32 includes a pair outwardly projecting supports 32a and 32b. A pair of force actuators 38 and 40 are connected between respective supports 32a and 32b and the frame member 34 on opposite sides of the joint 36. The force actuators 38 and 40 work in conjunction with one another to effect movement of the arm 34 in two directions. When current is applied to the force actuator 38, it shortens pulling the arm 34 upwardly. Conversely, when current is applied to the force actuator 40, it shortens pulling the arm 34 down. In either case, no current is applied to the opposing actuator (it is relaxed) so that it is passively extended when the opposing actuator 38 or 40 shortens.

Using the actuator 20 of the present invention, it is possible to precisely control the movement of a robotic device by regulating the current to the electromagnets 28. Thus, the present invention is capable of creating more life-like movements in animated figures. Also, the present invention may allow more intricate tasks to be performed in production processes than were previously possible.

What is claimed is:

1. A force transducer for a robotic device which is movable between an extended position and a retracted position, comprising:
  (a) first and second end pieces spaced from one another along a longitudinal axis;
  (b) a pair of flexible connecting members joining said first and second end pieces, said connecting members being disposed generally parallel to the longitudinal axis when the actuator is in an extended position;
  (c) a plurality of spaces disposed between the connecting members and spaced along said longitudinal axis so as to define a plurality of longitudinally-spaced segments, said connecting members being secured to opposing edges of said spacer;
  (d) a plurality of actuators disposed in pairs in respective segments for deflecting the connecting members relative to the longitudinal axis, each actuator pair including opposing first and second actuators disposed on opposite sides of the longitudinal axis with each actuator engaged with one of the connecting members, wherein the first and second actuators of each pair are moveable toward one another and away from one another along an actuator path disposed generally perpendicular to the longitudinal axis;
  (e) wherein the deflection of the connecting members causes the force transducer to axially contract along the longitudinal axis.

2. The force applying member of claim 1 wherein the actuators comprise a pair of electromagnets.

3. The force transducer of claim I wherein said actuators are fixedly secured to respective connecting members so as to prevent relative movement between the connecting members and the actuator.

4. The force transducer of claim 3 wherein the actuators are secured to the connecting members at the center of each segment.

5. The actuator of claim I wherein the connecting strip is displaced inwardly towards the longitudinal axis by the actuator.

6. A force applying cell movable between an extended position and a retracted position comprising:
  (a) first and second end pieces spaced from one another along a longitudinal axis;
  (b) a pair of flexible connecting strips joining said first and second end pieces and disposed on opposite sides of said longitudinal axis;
  (c) an actuator disposed adjacent each connecting strip for deflecting the connecting strip relative to the longitudinal axis, wherein the actuators are moveable toward one another and away from one another along an actuator path disposed generally perpendicular to the longitudinal axis; and (d) wherein the deflection of the connecting strips causes the force cell to axially contract along the longitudinal axis.

7. The actuator of claim 6 wherein the actuator comprise electromagnets.

8. The actuator of claim 6 wherein said actuators are fixedly secured to respective connecting strips so as to prevent relative movement between the connecting strips and the actuator.

9. The actuator of claim 8 wherein the actuators are secured to the connecting strips at the center of each segment.

10. The actuator of claim 6 wherein the connecting strip is displaced inwardly towards the longitudinal axis by the actuator.

11. A force applying member for a robotic device comprising:

(a) a plurality of axially contractible cells disposed in end-to-end relationship;

(b) wherein each cell includes:
   (1) first and second end pieces spaced from one another along a longitudinal axis;
   (2) a pair of flexible connecting strips joining said first and second end pieces and disposed on opposite sides of said longitudinal axis; and
   (3) an actuator disposed adjacent each connecting strip for deflecting the connecting strip relative to the longitudinal axis, wherein the actuators are moveable toward one another and away from one another along an actuator path disposed generally perpendicular to the longitudinal axis.

12. The actuator of claim 11 wherein the actuator comprise electromagnets.

13. The actuator of claim 11 wherein said actuators are fixedly secured to respective connecting strips so as to prevent relative movement between the connecting strips and the actuator.

14. The actuator of claim 13 wherein the actuators are secured to the connecting strips at the center of each segment.

15. The actuator of claim 11 wherein the connecting strip is displaced inwardly towards the longitudinal axis by the actuator.

16. A robotic device comprising:

(a) first and second frame members movable with respect to one another;

(b) a first force applying member connected between said first and second frame members for moving the frame members in a first direction relative to one another when the first force applying members axially contract;

(c) a second force applying member connected between said first and second frame members for moving the frame members in a second direction relative to one another when the second force applying member axially contracts;

(d) wherein said first and second force applying members each include:
   (1) first and second end pieces spaced from one another along a longitudinal axis;
   (2) a pair of flexible connecting strips joining said first and second end pieces and disposed on opposite sides of said longitudinal axis;
   (3) an actuator disposed adjacent each connecting strip for deflecting the connecting strip relative to the longitudinal axis, wherein the actuators are moveable toward one another and away from one another along an actuator path disposed generally perpendicular to the longitudinal axis.

17. The actuator of claim 16 wherein the actuator comprises electromagnets.

* * * * *